（12） United States Patent
Takano et al.

(10) Patent No.: US 6,749,055 B2
(45) Date of Patent: Jun. 15, 2004

(54) CAR TYPE CONVEYOR

(75) Inventors: Ryosuke Takano, Osaka (JP); Katsuyoshi Makimura, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/327,779

(22) Filed: Dec. 23, 2002

(65) Prior Publication Data

US 2003/0116407 A1 Jun. 26, 2003

(30) Foreign Application Priority Data

Dec. 26, 2001 (JP) .................................... 2001-393291
Dec. 26, 2001 (JP) .................................... 2001-393292

(51) Int. Cl.$^7$ ............................................. B65G 25/00
(52) U.S. Cl. ................................... 198/465.2; 104/168
(58) Field of Search .......................... 198/465.2, 465.3, 198/867.13; 104/168

(56) References Cited

U.S. PATENT DOCUMENTS 4,331,229 A * 5/1982 Kamm ..................... 198/345.3
4,671,186 A * 6/1987 Kunczynski ................. 104/168
5,299,680 A * 4/1994 Rhodes ..................... 198/465.2
6,502,691 B2 * 1/2003 Akatsuka et al. ........... 198/795

FOREIGN PATENT DOCUMENTS

| JP | H02-212261 | 8/1990 |
| JP | H02-141566 | 11/1990 |
| JP | H02-141567 | 11/1990 |
| JP | H03-239664 | 10/1991 |
| JP | H04-310463 | 11/1992 |
| JP | H11-255113 | 9/1999 |

* cited by examiner

Primary Examiner—Joseph A. Dillon
(74) Attorney, Agent, or Firm—Goodwin Procter LLP (57) ABSTRACT

A car type conveyor includes a guide rail 3 extending along one edge of a running path. The running path is fitted with a friction driver including a frictional wheel 32. A runner 2 is guided by and moves along the guide rail 3. The runner 2 has a frictional surface 29 formed on it for compressive contact with the frictional wheel 32. A carriage 1 includes wheels 8 and 9 and moves along the running path. The runner 2 and one of the right and left sides of the carriage 1 are connected together in such a manner that the top of the runner 2 is higher than the position at which the carriage 1 supports a body. The carriage 1 may be foldable toward the runner 2.

20 Claims, 10 Drawing Sheets

CAR TYPE CONVEYOR

FIELD OF THE INVENTION

The present invention relates to a car type conveyor suitable for the conveyance of large bodies on a car assembly line or the like.

PRIOR ART

A conventional car type conveyor for conveying large bodies includes a pair of guide rails extending on a floor. Carriages run on the guide rails and can be driven by the propulsive force transmitted from driving runners, which are fitted under the floor. Another conventional car type conveyor for conveying large bodies includes carriages, which run along a path extending on a floor. Each of these carriages has a frictional surface formed in parallel to the path. Friction drivers are fitted at intervals along one edge of the path and each include a frictional wheel for compressive contact with the frictional surfaces of the carriages. Each of the conventional conveyors, inclusive of the means for driving its carriage, is high in structure. It is difficult to lower each of the conventional conveyors without using the space under the floor.

SUMMARY OF THE INVENTION

The object of the present invention is to provide a car type conveyor low in structure and suitable for the conveyance of large bodies on it.

A car type conveyor according to the present invention includes a guide rail, a friction driver, a runner and a carriage. The guide rail extends along one edge of a running path. The friction driver is fitted in the running path and includes a frictional wheel. The runner is guided by and moves along the guide rail. The runner has a frictional surface formed on it for compressive contact with the frictional wheel. The carriage includes at least one wheel and moves along the running path. The runner and one of the right and left sides of the carriage are connected together in such a manner that the top of the runner is higher than the position at which the carriage supports a body.

It is possible to lower the whole conveyor and the carriage by:

1. positioning the runner, which frictionally drives the carriage, on one side of the carriage and making the top of the runner higher than the position at which the carriage supports a body (the bottom of the runner may be higher than, equal in height to or lower than the position at which the carriage supports a body);
2. causing the wheel of the carriage to bear at least part of the load on the carriage so that the runner and the guide rail may be lower in strength, thereby enabling the runner to be lower in structure: and
3. forming the frictional surface, which may be continuous along the length of the runner, which can be frictionally driven, so that the runner can easily be low in structure.

The carriage may include an inverted L riser protruding from its side adjacent to the runner. The riser includes a horizontal top extending over and connected to the runner. This makes it easy to support the side of the carriage on the runner. This also makes it possible to provide a simple and stable structure where the guide rail is supported directly over a floor.

Alternatively, the carriage may include a substantially horizontal extension extending from its side adjacent to the runner. The extension hangs from the bottom of the runner. This enables the carriage to be flat and simple and the cost to be low. In this case, even if the runner bears part of the load on the carriage, the runner can easily be lower in structure and can smoothly run.

The conveyor may include a number of runners, which are guided by the guide rail. Each runner has a frictional surface and connected to a carriage, that moves along the running path. Each runner may include a load bar for thrust that is longer than the body supported on each carriage. The conveyor may also include a number of friction drivers fitted in the running path. Each friction driver includes a frictional wheel for compressive engagement with the frictional surfaces of the runners. The load bar of the runner driven by each friction driver can thrust the load bar of the preceding runner out of engagement with the friction drivers, without causing the bodies on the associated carriages to interfere with each other. This makes it possible to greatly reduce the number of friction drivers. The frictional surface of each runner may be formed on one side of the associated load bar, which is necessary for thrust. This makes the runners simple in structure.

The carriage may include at least one pair of right and left wheels for preventing the load on it from acting on the runner. These wheels support the carriage and prevent the load on it from acting on the runner and the guide rail. This enables the runner and the guide rail to be small, making it easier to lower the height of the conveyor.

The carriage may include a wheel for sharing the load on the carriage with the runner. This wheel rolls on a running surface in the running path. In comparison with the case where the load on the carriage does not act on the runner, the carriage wheel prevents the runner from being overloaded often even if the smoothness of the running surface is slightly low. This enables both of the runner and the carriage to smoothly run.

The carriage may include a middle wheel fitted near the midpoint between both its sides and an outer wheel fitted near its side far from the runner. The middle wheel and one of the outer wheel and the runner can bear the load on the carriage. The middle and outer wheels roll on a middle running surface and an outer running surface respectively of the running path. If the middle wheel is kept in contact with the middle running surface, one of the outer wheel and the runner can keep the carriage in a position in which the carriage supports a body. This enables the carriage to stably run. In this case, it is easy to install the guide rail and form the outer running surface.

The wheels of the carriage may be fitted substantially at the middle position between the front and rear of the carriage. In this case, the runner and the guide rail regulate the direction in which the carriage is oriented and the position in which the carriage supports a body. This enables the carriage to run smoothly in a horizontal curved passage of the running path.

The carriage may be a folding carriage including a base part and a movable part. One side of the base part is supported by the runner. One side of the movable part is connected to the other side of the base part in such a manner that the movable part can be folded over the base part. Each of the base part and the movable part includes a wheel. The wheels of the two parts roll on a running surface in the running path.

While the folding carriage is conveying a body, the body can be supported stably on the carriage unfolded to have a necessary width extending over the base part and the movable part. While the folding carriage is empty, it is possible to fold the movable part over the base part to greatly reduce the width of the carriage, which extend laterally from the runner. Even with the movable part folded, the carriage can run with the base part supported stably by its wheel and the runner, which is supported by the guide rail. Accordingly, although the folding carriage is suitable for the conveyance of a car body or another large body, it is possible to increase the efficiency of utilization of the floor by greatly reducing the floor area occupied by the passage of the running path where the carriage is empty.

The movable part of the folding carriage may be narrow so as not to be folded over the runner. This enables the conveyor to be low in structure with the carriage folded. This also enables the path passage where the carriage is empty to extend in a low space. This further enables the folded carriage to run safely without a means provided for locking the movable part in a folded position.

Alternatively, the movable part of the folding carriage may be wide so as to be folded over the runner. In this case, the base part of the folding carriage may be sufficiently narrow so that the path passage where the carriage is empty can be narrower.

The wheel of the base part of the folding carriage may be fitted near the side of the base part that is adjacent to the movable part. The wheel of the movable part of the folding carriage may be fitted near the side of the movable part that is far from the base part. In this case, while the movable part is folded over the base part, the base part is supported by its wheel and the runner.

The wheels of the folding carriage are positioned substantially at the middle position between the front and rear of the carriage. In this case, the runner and the guide rail regulate the running direction and the horizontal position of the carriage.

The base part of the folding carriage may include an inverted L riser rising on its side supported by the runner. The riser includes a horizontal top extending over and connected to the runner.

The base part of the folding carriage may include a substantially horizontal extension extending from the side thereof supported by the runner. The extension hangs from the bottom of the runner.

The running path may be endless and include a first passage and a second passage. The folding carriage may run with a body loaded thereon in the first passage. The folding carriage may run without a body loaded thereon in the second passage, with the movable part folded over the base part. The inner edges of the two passages are adjacent to each other. The guide rail may be endless and extend along the inner edges. This makes it easy to lay out the two passages in parallel on or over a narrow beltlike floor.

BRIEF DESCRIPTION OF THE DRAWINGS

FIG. 12 shows how the conveyor is installed.

PREFERRED EMBODIMENTS OF THE INVENTION

FIGS. 1A, 1B, 2, 3A and 3B show a car type conveyor embodying the present invention. The conveyor has an endless running path (not shown) extending on a floor. A pair of horizontal H-steel rails 10 and 11 extend in the running path. A pair of horizontal groove type guide rails 3 (3a and 3b) extend along the inner edge of the running path.

The conveyor includes a number of carriages 1 in the form of horizontal frameworks, one of which is shown. The inner side of each carriage 1 is connected to a runner 2, which is guided by the guide rails 3. The carriage 1 can support a middle portion of a car body or another body W. The carriage 1 includes a pair of wheels 8 and 9, which are positioned in symmetry on the right and left sides of the center line of the body W on the carriage 1. The wheels 8 and 9 roll on the upper flat surfaces 7a and 7b of the H-steel rails 10 and 11 respectively. Alternatively, the wheels 8 and 9 could roll directly on the floor, or on a pair of strips laid on the floor.

The carriage 1 includes a front cross bar 1a and a rear cross bar 1b, which extend across the H-steel rails 10 and 11. The carriage 1 also includes a pair of connecting bars 12 and 13, which extend at right angles to the cross bars 1a and 1b. The front ends of the connecting bars 12 and 13 rest on the front cross bar 1a. The rear ends of the connecting bars 12 and 13 rest on the rear cross bar 1b. The lower sides of the connecting bars 12 and 13 are supported by the wheels 8 and 9 respectively. The upper halves of the wheels 8 and 9 are positioned in the thickness of the carriage 1 so that the carriage can be very low in structure. Alternatively, both end portions of the connecting bars 12 and 13 might curve downward, and the end faces of these bars might be fixed to the inner sides of the cross bars 1a and 1b. The carriage 1 further includes four supporting jigs 14 for supporting a body W. Two of the supporting jigs 14 rest on each of the cross bars 1a and 1b.

The carriage 1 includes an inverted L riser 15 rising and protruding outward on its inner side. The riser 15 includes a front horizontal cross bar 15a and a rear horizontal cross bar 15b, which extend over the runner 2 and the guide rails 3 so that the runner 2 can be positioned above the jigs 14 on the carriage 1.

The runner 2 is slightly longer than the body W supported on the carriage 1. Both end portions of the supported body W protrude from the front and rear of the carriage 1. The runner 2 includes a middle load bar 16, a front connecting load bar 18, a rear connecting load bar 19, a front end load bar 21 and a rear end load bar 22. The end load bars 21 and 22 are short. Both end portions of the middle load bar 16 support the cross bars 15a and 15b of the riser 15. The front and rear ends of the middle load bar 16 are connected to the rear end of the front connecting load bar 18 and the front end of the rear connecting load bar 19 respectively by vertical pins 17 in such a manner that the connecting bars 18 and 19 can pivot horizontally with respect to the middle bar 16. The front end of the front connecting load bar 18 and the rear end of the rear connecting load bar 19 are connected to the rear end of the front end load bar 21 and the front end of the rear end load bar 22 respectively by vertical pins 20 in such a manner that the end bars 21 and 22 can pivot horizontally with respect to the connecting bars 18 and 19 respectively. The vertical pins 17 at the front and rear ends of the middle load bar 16 are supported by a pair of middle trolleys 23 and 24 respectively. The middle and connecting load bars 16, 18 and 19 can pivot horizontally on the pins 17 with respect to the middle trolleys 23 and 24. The front and rear end load bars 21 and 22 are fixed to the tops of a front end trolley 25 and a rear end trolley 26 respectively.

The trolleys 23–26 are identical in structure and each include a front pair of horizontal-axis rollers 27, a rear pair of horizontal-axis rollers 27, a front vertical-axis roller 28 and a rear vertical-axis roller 28. The horizontal axes of the rollers 27 of each of the end trolleys 25 and 26 are perpendicular to the associated end load bar 21 or 22. The horizontal-axis rollers 27 are in engagement with the grooves of the guide rails 3. The vertical-axis rollers 28 are in engagement with the upper lips of the guide rails 3. The guide rails 3 are connected together and supported at a constant height from the floor by a number of U-shaped brackets 3c, which are positioned at suitable intervals along the rails 3.

The side faces of the load bars 16, 18, 19, 21 and 22 form two frictional surfaces 29 on both sides of the runner 2. The frictional surfaces 29 extend along the length of the runner 2. Friction drivers 30 are fitted along the guide rails 3 and spaced at intervals longer than the runner 2. Each of the friction drivers 30 includes a vertical-axis frictional wheel 32, which can be driven by a motor 31. The frictional wheels 32 of the drivers 30 engage compressively with one of the frictional surfaces 29 of the runner 2 to drive the runner 2 at a constant speed along the guide rails 3. As shown with two-dot chain lines, each of the friction drivers 30 may also include a vertical-axis back-up roller 33 for urging the load bars 16, 18, 19, 21 and 22 against the associated frictional wheel 32.

The rotation of the frictional wheels 32 drives the runners 2 in order to circulate the runners 2 and the carriages 1 along the running path. The front end load bar 21 of the runner 2 driven by each of the friction drivers 30 thrusts the rear end load bar 22 of the preceding runner 2.

The intermittent rotation of the frictional wheels 32 intermittently drives the runners 2. The running path consists of a linear assembly passage, a linear return passage and two arcuate U-turn passages. The linear passages are parallel to each other. Each of the arcuate passages connects one end of the linear assembly passage and the adjacent end of the linear return passage. The rear end of the linear assembly passage (or the front end of the linear return passage) is fitted with a loading station (not shown). The front end of the linear assembly passage (or the rear end of the linear return passage) is fitted with an unloading station (not shown). A body W can be loaded on the carriage 1 stopping at the loading station. Parts can be assembled or fitted onto the body W on the carriage 1 running intermittently in the linear assembly passage from the loading station to the unloading station. The body W can be unloaded from the carriage 1 stopping at the unloading station.

Figure 1A:
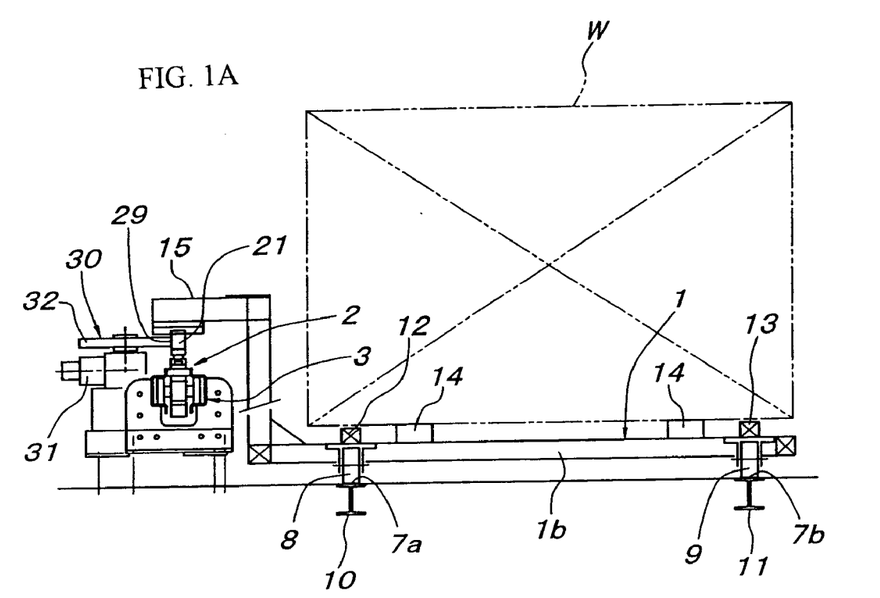
FIG. 1A is a vertical section of part of a car type conveyor according to a first embodiment of the present invention.
Figure 1B:
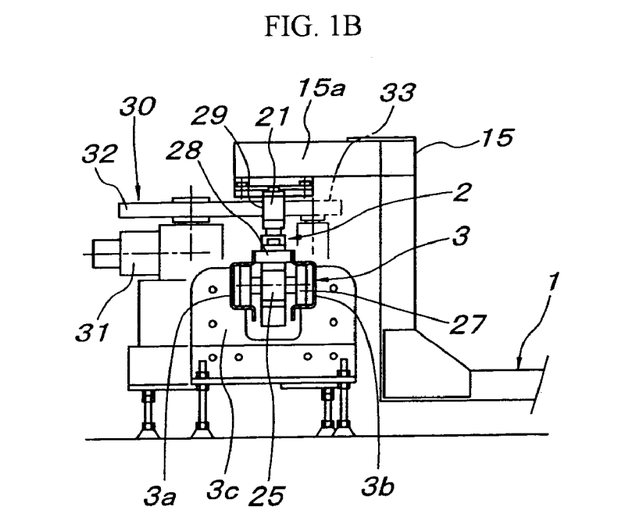
FIG. 1B is an enlarged vertical section of part of the conveyor according to the first embodiment.
Figure 2:
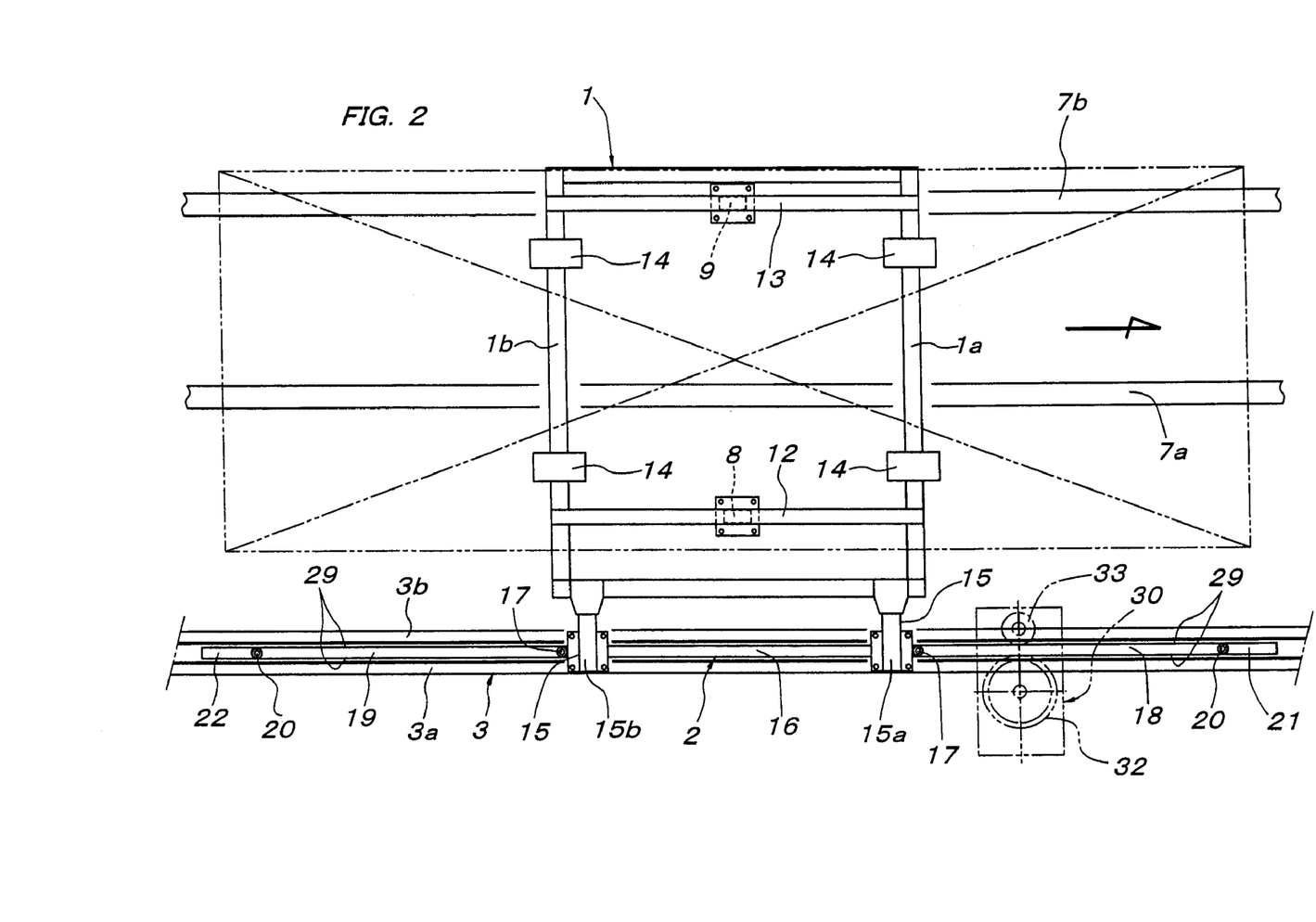
FIG. 2 is a top plan of part of the conveyor according to the first embodiment.
Figures 3A, 3B:
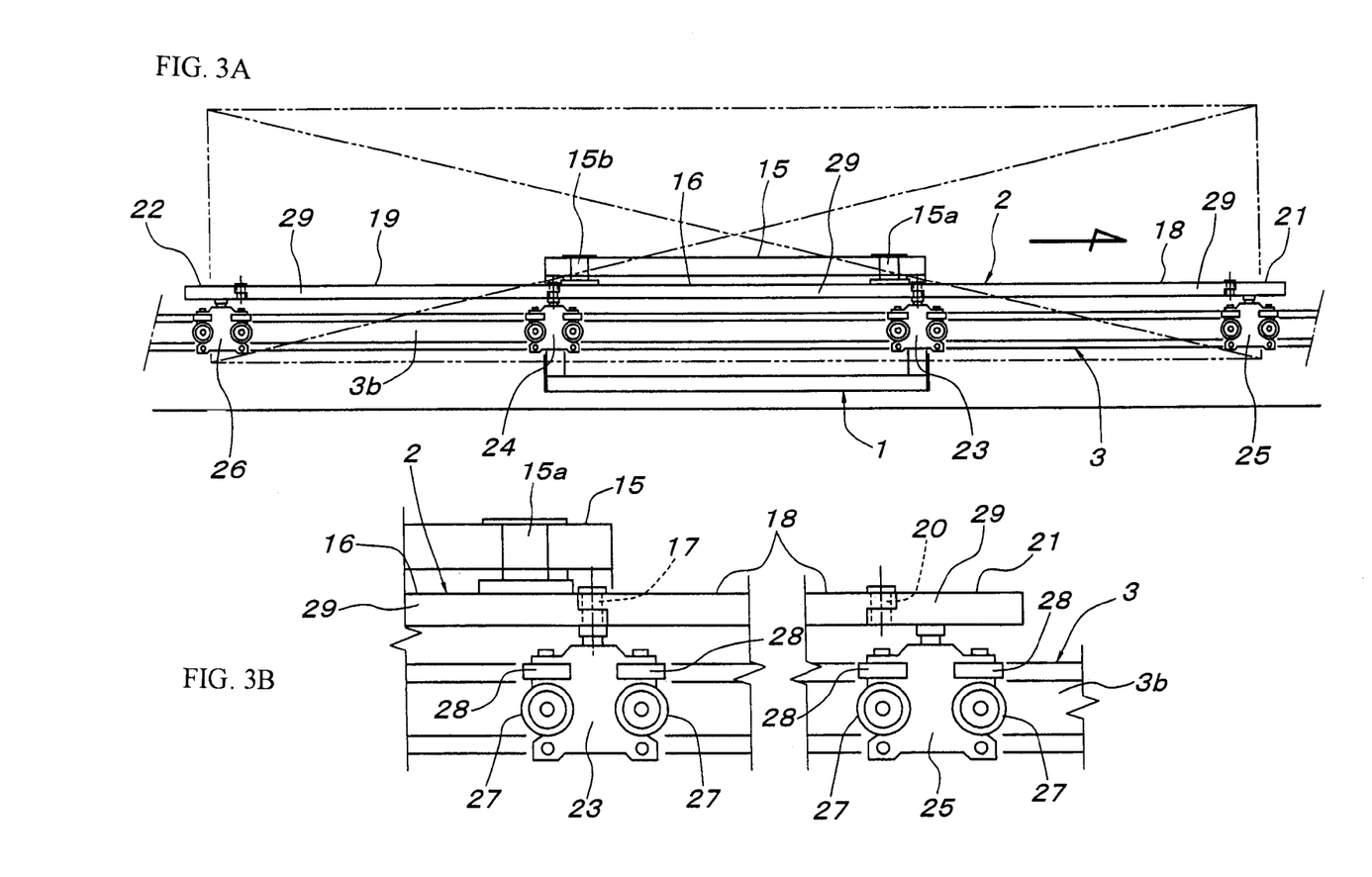
FIG. 3A is a side view of part of the conveyor according to the first embodiment.
FIG. 3B is an enlarged side view of part of the conveyor according to the first embodiment.

As shown in FIGS. 1A and 3A, the carriage 1 loaded with the body W is substantially horizontal as a whole. The load on the carriage 1 is born through the wheels 8 and 9 by the H-steel rails 10 and 11. In order to ensure that the inner wheel 8 is kept from floating above the rail 10, there is vertical play between each horizontal-axis roller 27 of the runner trolleys 23–26 and the associated guide rail 3.

Alternatively, each carriage 1 might be fitted with a front pair of wheels and a rear pair of wheels, which can support four outer portions of the carriage 1. In this embodiment, the two coaxial wheels 8 and 9 support the middle of the carriage 1 in such a manner that the carriage can seesaw on the axis of the wheels 8 and 9. However, the engagement of the horizontal-axis rollers 27 of the middle trolleys 23 and 24 with the guide rails 3 prevents the carriage 1 from seesawing on the wheel axis and keeps the carriage substantially horizontal. The engagement of the vertical-axis rollers 28 of the middle trolleys 23 and 24 with the guide rails 3 keeps the carriage 1 parallel to these rails.

Figure 4:
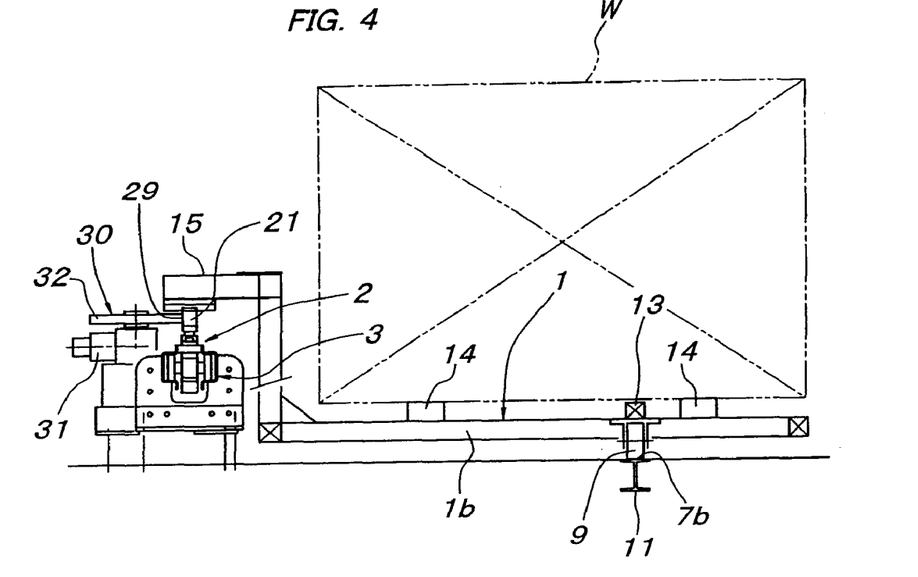
FIG. 4 is a vertical section of part of a car type conveyor according to a second embodiment of the present invention.

FIG. 4 shows another car type conveyor embodying the present invention. This conveyor includes carriages 1 each connected to a runner 2, which may be identical with the runners 2 of the first embodiment. These carriages 1 are similar to those of the first embodiment, but each fitted with a single wheel 9 near the outer side thereof. The single wheel 9 rolls on a horizontal H-steel rail 11. The single wheel 9 and the associated runner 2 share the load of a body W that acts on the associated carriage 1. Part of this load is born on a pair of horizontal guide rails 3 through the horizontal-axis rollers 27 of the middle trolleys 23 and 24 of the runner 2, which supports the inner side of the carriage 1.

Figure 5:
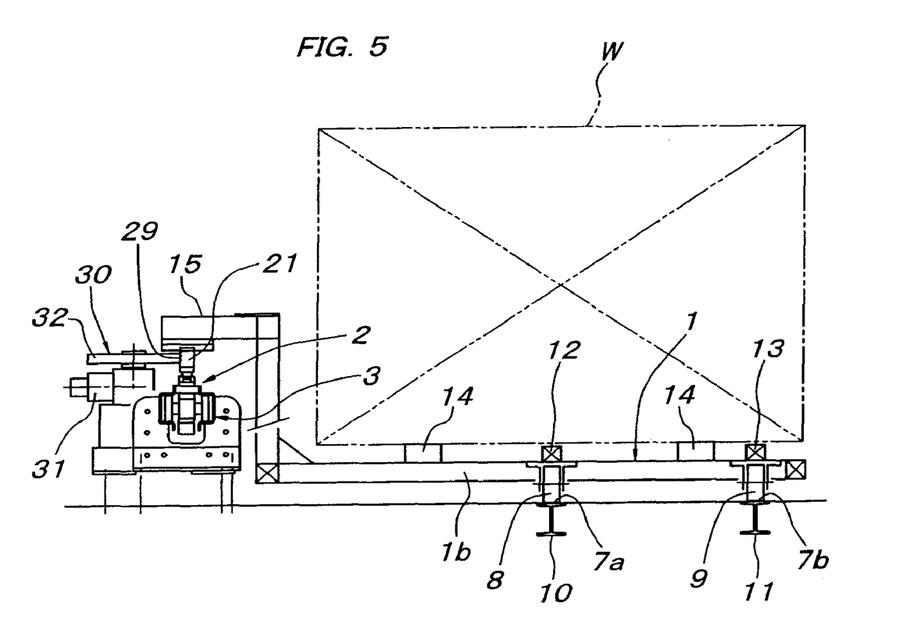
FIG. 5 is a vertical section of part of a car type conveyor according to a third embodiment of the present invention.

FIG. 5 shows still another car type conveyor embodying the present invention. This conveyor includes carriages 1 each connected to a runner 2, which may be identical with the runners 2 of the foregoing embodiments. These carriages 1 are similar to those of the first embodiment, but each fitted with a pair of wheels 8 and 9 near the center and outer side respectively thereof. The wheels 8 and 9 roll on a pair of H-steel rails 10 and 11 respectively. The inner wheel 8 is kept in contact with the H-steel rail 10. The inner wheel 8 and one of the outer wheel 9 and the associated runner 2 share the load of a body W that acts on the associated carriage 1. One of the outer wheel 9 and the runner 2 prevents the carriage 1 from seesawing right and left on the inner wheel 8. The prevention keeps the carriage 1 in a substantially horizontal supporting position.

Figure 6:
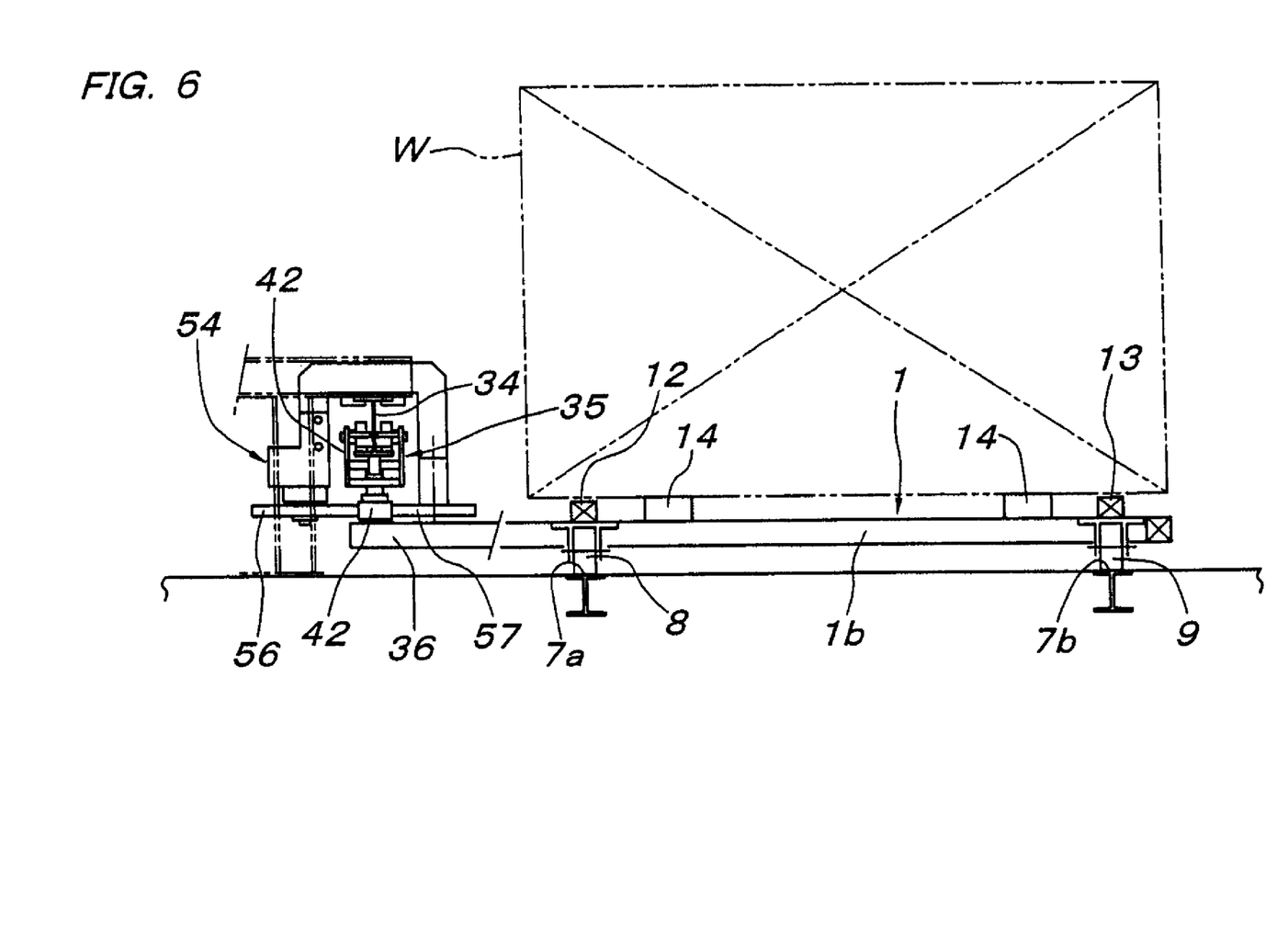
FIG. 6 is a vertical section of part of a car type conveyor according to a fourth embodiment of the present invention.
Figure 7A:
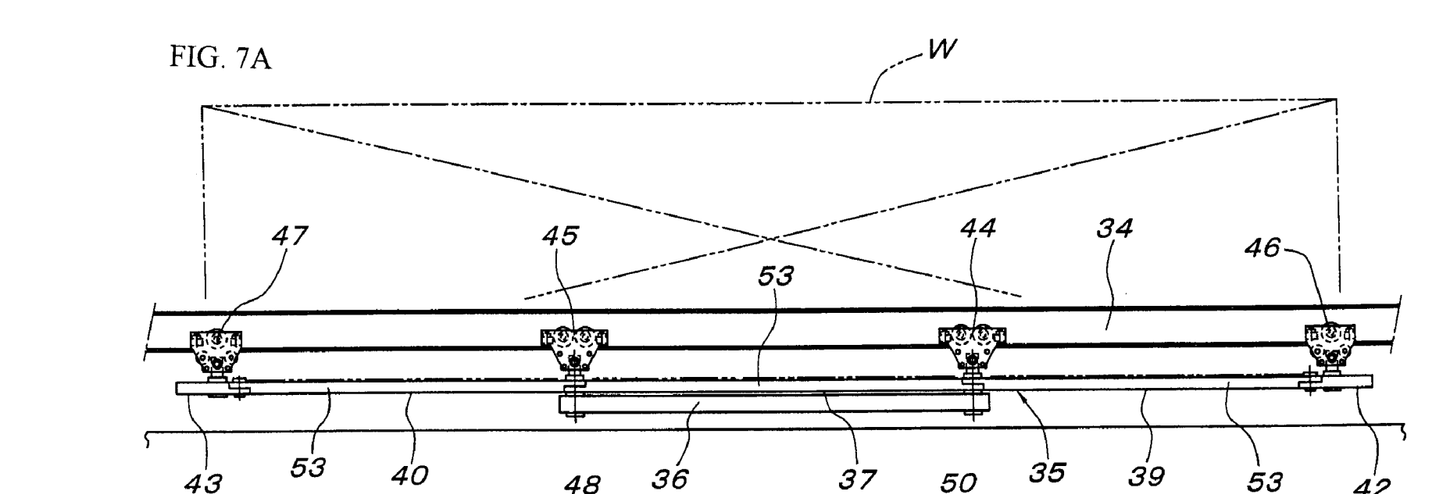
FIG. 7A is a side view of part of the conveyor according to the fourth embodiment.
Figure 7B:
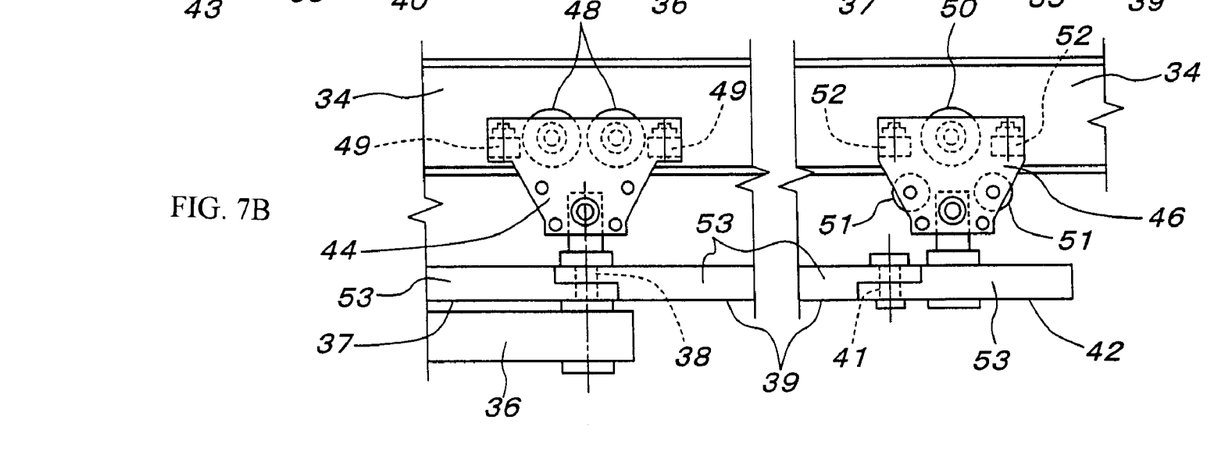
FIG. 7B is an enlarged side view of part of the conveyor according to the fourth embodiment.
Figure 8:
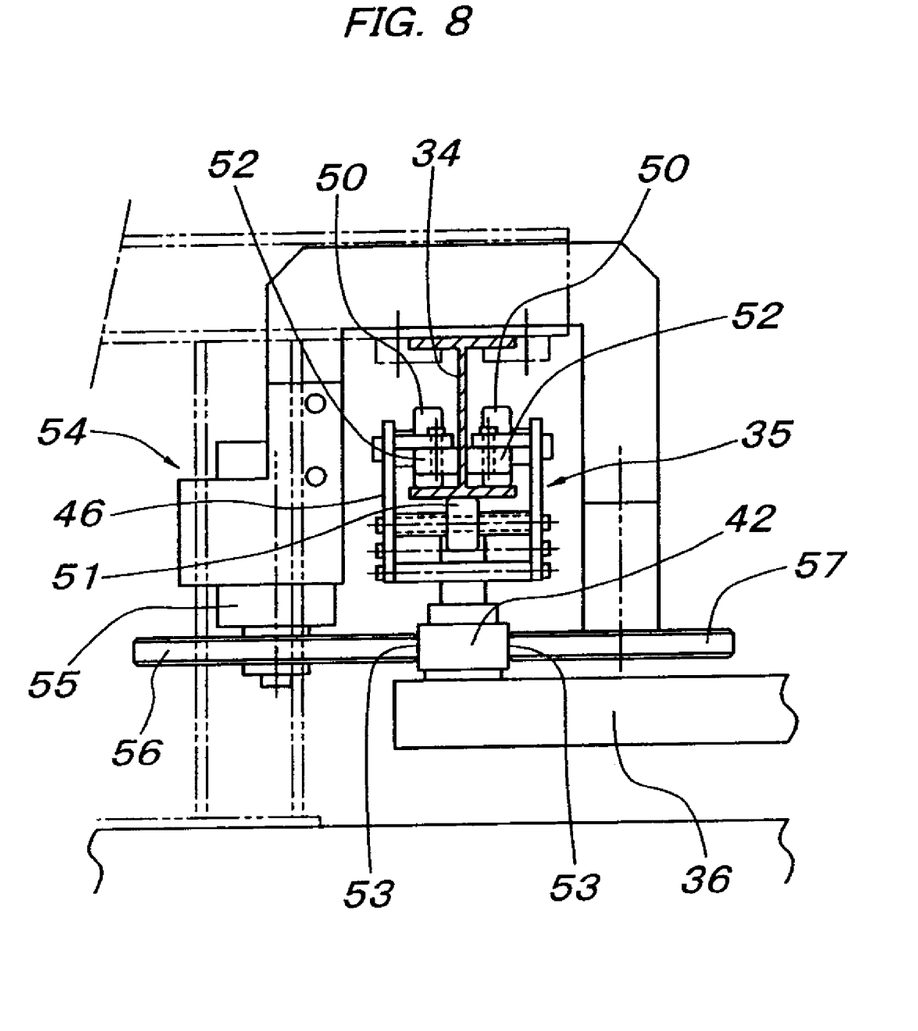
FIG. 8 is an enlarged vertical section of part of the conveyor according to the fourth embodiment.

FIGS. 6–8 show a further car type conveyor embodying the present invention. This conveyor includes runners 35 hanging from a horizontal guide rail 34, along which they run. The conveyor also includes carriages 1, which are similar to those of the first embodiment. Each of these carriages 1 includes a horizontal extension 36, which extends from its inner side and hangs from the bottom of one of the runners 35. This arrangement positions the top of the runner 35 above the supporting jigs 14 of the carriage 1. The tops of the supporting jigs 14 are slightly higher than the bottom of the runner 35, but could be lower than it as is the case with the first embodiment.

The hanging runner 35 is slightly longer than the body W supported on the carriage 1. Both end portions of the supported body W protrude from the front and rear of the carriage 1. The runner 35 includes a middle load bar 37, a front connecting load bar 39, a rear connecting load bar 40, a front end load bar 42 and a rear end load bar 43. The end load bars 21 and 22 are short. The front and rear ends of the middle load bar 37 are connected to the rear end of the front connecting load bar 39 and the front end of the rear connecting load bar 40 respectively by vertical pins 38 in such a manner that the connecting bars 39 and 40 can pivot horizontally with respect to the middle bar 37. The front end of the front connecting load bar 39 and the rear end of the rear connecting load bar 40 are connected to the rear end of the front end load bar 42 and the front end of the rear end load bar 43 respectively by vertical pins 41 in such a manner that the end bars 42 and 43 can pivot horizontally with respect to the connecting bars 39 and 40 respectively. The vertical pins 38 at the front and rear ends of the middle load bar 37 hang from a pair of middle trolleys 44 and 45 respectively. The front and rear end load bars 42 and 43 are fixed to a front end trolley 46 and a rear end trolley 47 respectively. The front and rear ends of the carriage extension 36 hang from the front and rear ends respectively of the middle load bar 37 through the vertical pins 38. The middle and connecting load bars 37, 39 and 40 can pivot horizontally on the vertical pins 38 with respect to the middle trolleys 44 and 45.

The middle trolleys 44 and 45 are identical in structure and each include a front pair of horizontal-axis rollers 48, a rear pair of horizontal-axis rollers 48, a front pair of vertical-axis rollers 49 and a rear pair of vertical-axis rollers 49. The horizontal-axis rollers 48 roll on the lower lips of a horizontal H-steel guide rail 34. The vertical-axis rollers 49 pinch the vertical part of the guide rail 34.

The end trolleys 46 and 47 are identical in structure and each include a pair of horizontal-axis rollers 50, a pair of horizontal-axis back-up rollers 51, a front pair of vertical-axis rollers 52 and a rear pair of vertical-axis rollers 52. The horizontal axes of the rollers 50 and 51 of each of the end trolleys 46 and 47 are perpendicular to the associated end load bar 42 or 43. The horizontal-axis rollers 50 roll on the lower lips of the guide rail 34. The back-up rollers 51 are in contact with the lower surface of the guide rail 34 in front and back of the horizontal-axis rollers 50. The vertical-axis rollers 52 pinch the vertical part of the guide rail 34.

The side faces of the load bars 37, 39, 40, 42 and 43 form two frictional surfaces 53 on both sides of the runner 35. The frictional surfaces 29 extend along the length of the runner 2. Friction drivers 54 are fitted at intervals along the guide rail 34. Each friction driver 54 includes a vertical-axis frictional wheel 56 and a vertical-axis backup roller 57. The frictional wheel 56 can be driven by a motor 55. The back-up roller 57 can urge the load bars 37, 39, 40, 42 and 43 against the frictional wheel 56. The frictional wheels 56 of the drivers 54 engage compressively with one of the frictional surfaces 53 of the runner 35 to drive the runner 35 at a constant speed along the guide rail 34. The front end load bar 42 of the runner 35 driven by each of the friction drivers 54 thrusts the rear end load bar 43 of the preceding runner 35.

Figure 9A:
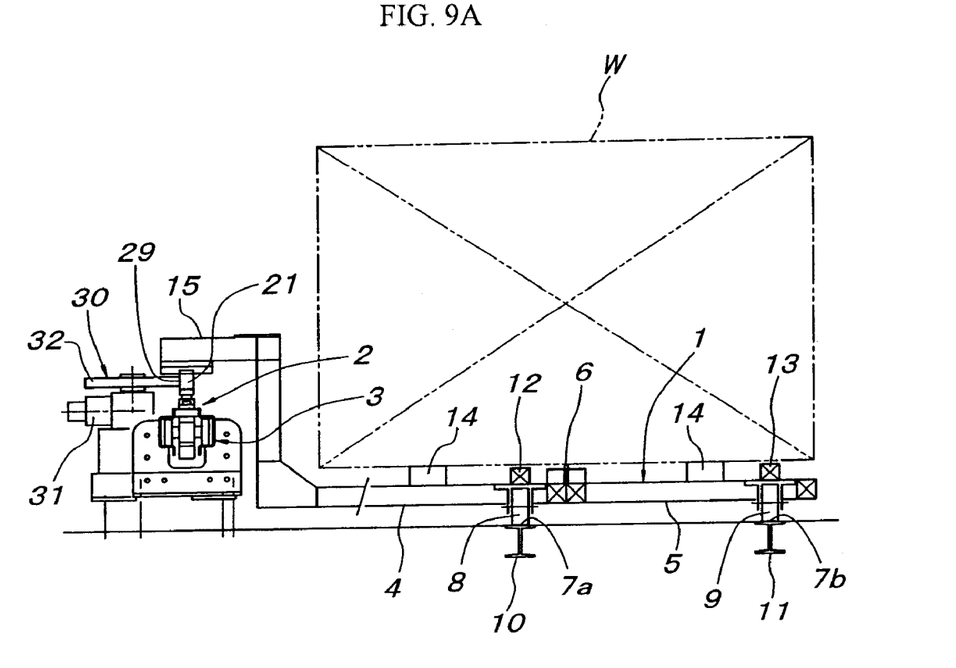
FIG. 9A is a vertical section of part of a car type conveyor according to a fifth embodiment of the present invention.
Figure 9B:
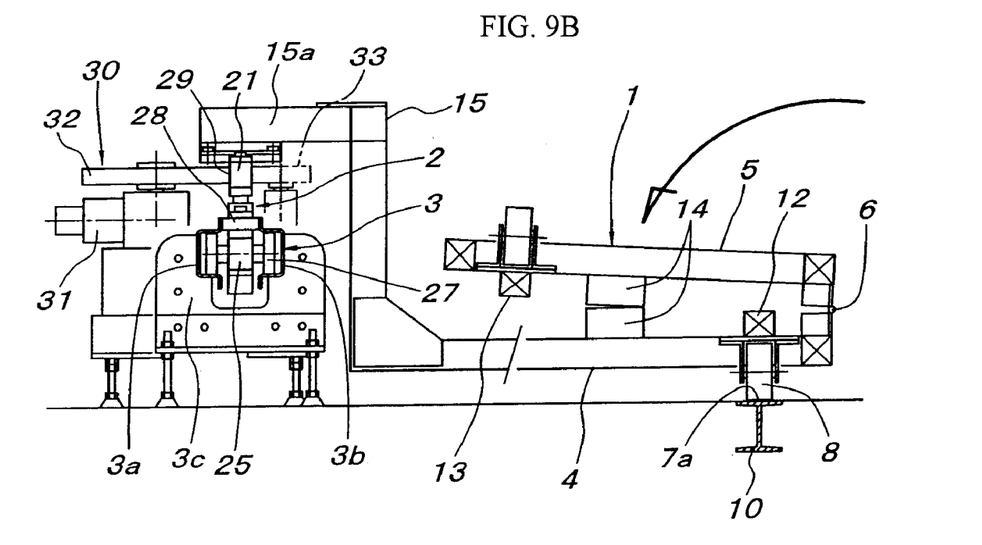
FIG. 9B is an enlarged vertical section of part of the conveyor according to the fifth embodiment, showing a carriage having been folded.

FIGS. 9A and 9B show a further car type conveyor embodying the present invention. This conveyor includes a number of folding carriages 1 each consisting of an inner base framework 4 and an outer movable framework 5. The base framework 4 includes a horizontal portion and an inverted L riser 15. Each of the horizontal portion of the base framework 4 and the movable framework 5 is fitted with two supporting jigs 14. The riser 15 is connected to a runner 2, which may be identical with the runners 2 of the first and second embodiments. The horizontal portion of the base framework 4 is connected to the movable framework 5 by hinges 6. While each empty folding carriage 1 is running in the return passage of a horizontal running path, as shown in FIG. 9B, its movable framework 5 can be folded over the horizontal portion of its base framework 4. This makes it possible to greatly narrow the return path.

When the movable framework 5 is folded, its supporting jigs 14 rest on the supporting jigs 14 of the base framework 4. Alternatively, each folding carriage 1 might include an exclusive support for supporting its folded movable framework 5.

Figure 10:
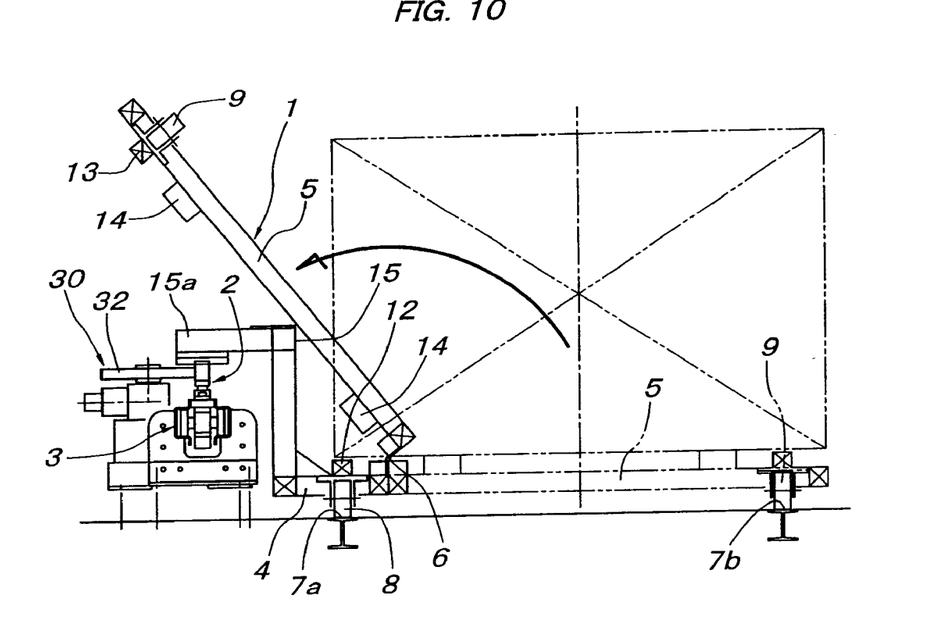
FIG. 10 is a vertical section of part of a car type conveyor according to a sixth embodiment of the present invention.

FIG. 10 shows a further car type conveyor embodying the present invention and similar to that shown in FIGS. 9A and 9B. The outer movable framework 5 of each folding carriage 1 of this conveyor is wider than the associated inner base framework 4 so that it can be folded over the associated runner 2. When the movable framework 5 is folded, it simply rests against the riser 15 of the base framework 4. For greater safety, it is preferable that the carriage 1 be fitted with a lock for locking the resting movable framework 5.

Figure 11:
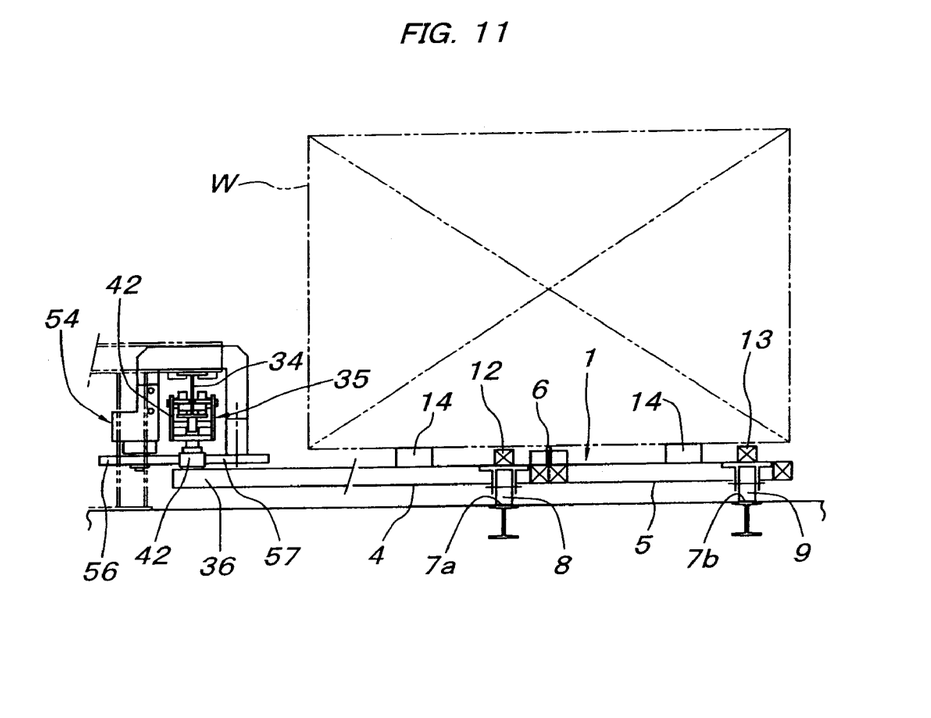
FIG. 11 is a vertical section of part of a car type conveyor according to a seventh embodiment of the present invention.

FIG. 11 shows a further car type conveyor embodying the present invention. This conveyor includes a number of folding carriages 1 each combined with a hanging runner 35, which may be identical with that shown in FIGS. 6 and 7. The runners 35 of this conveyor hang from and run along a horizontal guide rail 34. Each of these carriages 1 consists of an inner base framework 4 and an outer movable framework 5. The base framework 4 includes a horizontal extension 36, which hangs from the associated runner 35.

Each of the folded carriages 1 might be supported in the form of a cantilever by a runner 2. As shown in FIGS. 9A, 9B, 10 and 11, however, it is preferable that the inner base framework 4 of each folding carriage 1 be fitted with a wheel 8 near its outer side, which supports the inner side of the associated outer movable framework 5. The wheel 8 and the associated runner 2 or 35 support the folded carriage 1. The movable framework 5 is fitted with a wheel 9 near its outer side. When the unfolded carriage 1 is loaded with a body W, the outer wheel 9 is in contact with the upper surface 7b of a horizontal endless rail. When the carriage 1 is loaded, the inner wheel 8 may float slightly from the upper surface 7a of another horizontal endless rail so that the outer wheel 9 and the runner 2 or 35 may bear the load on the carriage 1. Alternatively, the wheels 8 and 9 may bear the load on the carriage 1 so that the load may not act on the runner 2 or 35.

Figure 12:
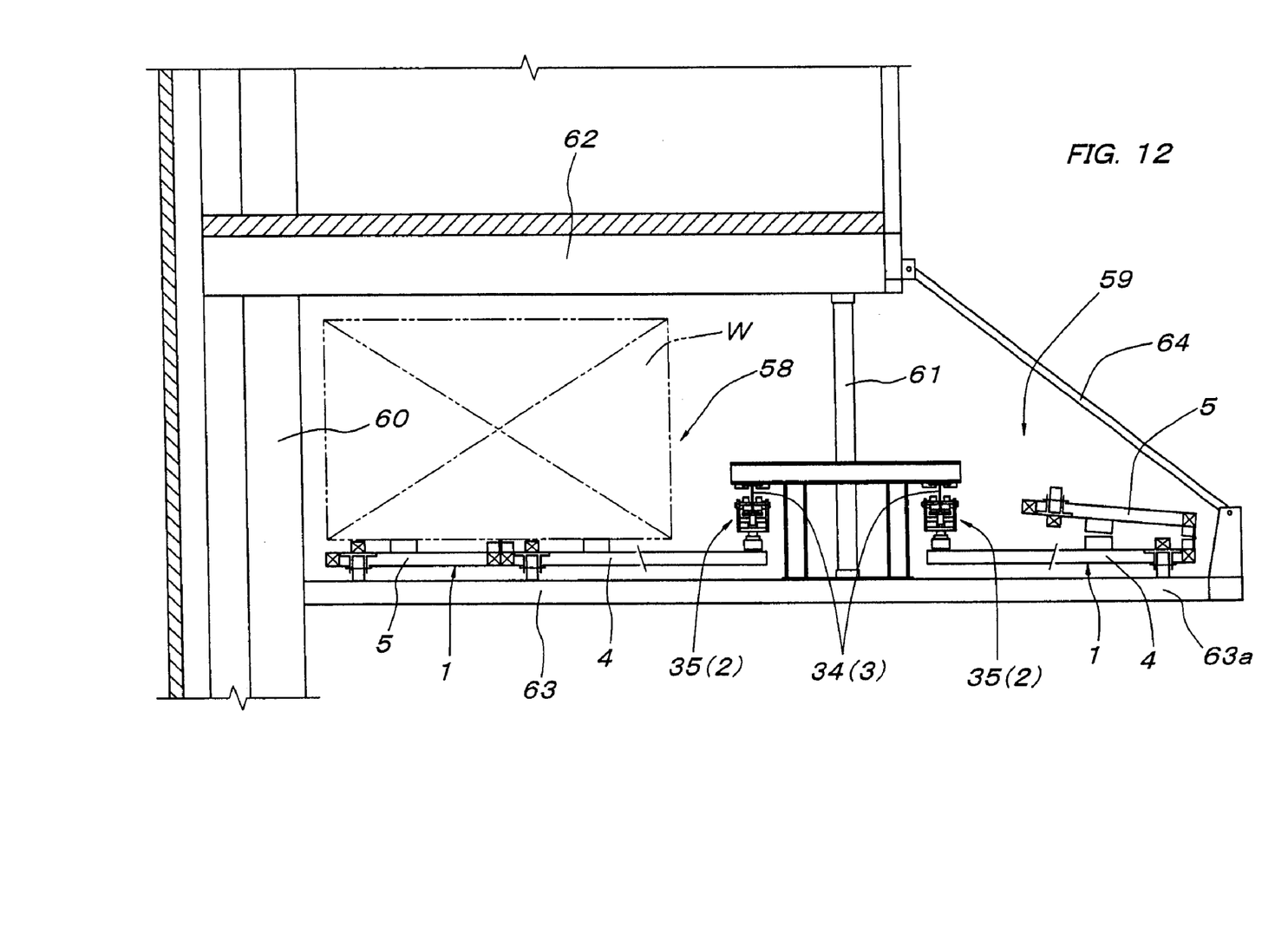
FIG. 12 is a vertical section of another car type conveyor embodying the present invention and including folding carriages.

FIG. 12 shows a further car type conveyor embodying the present invention and including a number of folding carriages 1, which are similar to the carriage 1 shown in FIG. 11. This conveyor has a horizontal endless running path consisting of an assembly passage 58 and a return passage 59. The inner edges of the passages 58 and 59 are adjacent to each other. An endless guide rail 34 (rails 3) extends along the inner edges of the passages 58 and 59. Runners 35 (2) run along the guide rail 34 (rails 3). The carriages 1 run in the assembly passage 58, each with a body W loaded thereon. The carriages 1 run in the return passage 59, each without a body W loaded thereon, with their respective outer movable frameworks 5 folded over their respective inner base frameworks 4.

As shown in FIG. 12, a house includes a floor (not shown), pillars 60 and an upper slab 62. A horizontal supporting frame 63 extends over the floor. One edge of the supporting frame 63 is supported by the pillars 60. The supporting frame 63 hangs by hangers 61 from the upper slab 62. The supporting frame 63 consists of an inner portion adjacent the pillars 60 and an outer portion 63a. The hangers 61 are positioned between the inner and outer portions of the supporting frame 63. The assembly passage 58 extends on the inner portion of the supporting frame 63. The return passage 59 extends on the outer frame portion 63a. The outer frame portion 63a protrudes in the form of a cantilever from the hangers 61. The outer edge of the outer frame portion 63a and the upper slab 62 are connected by oblique supports 64. The arrangement shown in FIG. 12 makes it possible to greatly narrow the outer frame portion 63a, thin the oblique supports 64 and reduce them in number.

In each of the conveyors shown in FIGS. 9A–12, the outer movable frameworks of the empty carriages may be folded and unfolded manually by operators when the carriages stop at a folding position and an unfolding position. Alternatively, a folder and an unfolder may be provided at the folding and unfolding positions. When the carriages stop at the folding and unfolding positions, the folder and the unfolder can be automatically or manually started so as to automatically fold and unfold the movable frameworks. Alternatively, the carriages may be fitted with folders and unfolders.

In each of the conveyors, each frictional surface 29 or 53 of the runners 2 or 35 is longer than each body W. The front end load bar 21 or 42 of the runner 2 or 35 driven directly by one of the associated friction drivers 30 or 54 thrusts the rear end load bar 22 or 43 of the preceding runner, which is out of engagement with the friction drivers. Alternatively, the friction drivers 30 or 54 might be spaced at intervals nearly equal to or shorter than the runners 2 or 35 so that the drivers 30 or 54 could drive all of the runners 2 or 35 in a friction drive path at the same time. In this case, the runners 2 or 35 could be shorter than the bodies W and driven independently in such a manner that the body W on each of the carriages 1 might not interfere with the bodies W on the adjacent carriages 1.

What is claimed is:

1. A car type conveyor comprising:
   a guide rail extending along one edge of a running path;
   a friction driver fitted in the running path and including a frictional wheel;
   a runner guided by and movable along the guide rail, the runner having a frictional surface formed thereon for compressive contact with the frictional wheel; and
   a carriage movable along the running path, the carriage including at least one wheel;
   wherein the runner and one of the right and left sides of the carriage are connected together in such a manner that the top of the runner is higher than the position at which the carriage supports a body.

2. A car type conveyor according to claim 1, wherein the carriage includes an inverted L riser protruding from the side thereof adjacent to the runner, the riser including a horizontal top extending over and connected to the runner.

3. A car type conveyor according to claim 1, wherein the carriage includes a substantially horizontal extension extending from the side thereof adjacent to the runner and hanging from the bottom of the runner.

4. A car type conveyor according to claim 1, wherein the runner includes a load bar for thrust that is longer than the body supported on the carriage.

5. A car type conveyor according to claim 4, wherein the frictional surface is formed on one side of the load bar.

6. A car type conveyor according to claim 1, wherein the carriage includes at least one pair of right and left wheels for preventing the load on the carriage from acting on the runner.

7. A car type conveyor according to claim 1, wherein the carriage includes a wheel for sharing the load on the carriage with the runner.

8. A car type conveyor according to claim 1, wherein the carriage includes a middle wheel fitted near the midpoint between both sides thereof and an outer wheel fitted near the side thereof far from the runner, and wherein the middle wheel and one of the outer wheel and the runner can bear the load on the carriage.

9. A car type conveyor according to claim 6, wherein the wheels of the carriage are fitted substantially at the middle position between the front and rear of the carriage, and wherein the runner and the guide rail regulate the direction in which the carriage is oriented and the position in which the carriage supports a body.

10. A car type conveyor according to claim 1, wherein the running path has a running surface extending therein, and wherein the carriage includes a base part, one side of which is supported by the runner, and a movable part, one side of which is connected to the other side of the base part in such a manner that the movable part can be folded over the base part, the base part and the movable part including a first wheel and a second wheel respectively for rolling on the running surface.

11. A car type conveyor according to claim 10, wherein the first wheel of the carriage is fitted near the side of the base part that is adjacent to the movable part, the second wheel fitted near the side of the movable part that is far from the base part, and wherein the movable part can be folded over the base part outside the runner, with the base part supported by the first wheel and the runner.

12. A car type conveyor according to claim 10, wherein the first wheel of the carriage is fitted near the side of the base part that is adjacent to the movable part, the second wheel fitted near the side of the movable part that is far from the base part, and wherein the movable part can be folded over the base part and the runner, with the base part supported by the first wheel and the runner.

13. A car type conveyor according to claim 10, wherein the wheels of the carriage are positioned substantially at the middle position between the front and rear of the carriage, and wherein the runner and the guide rail regulate the direction in which the carriage is oriented and the position in which the carriage supports a body.

14. A car type conveyor according to claim 11, wherein the wheels of the carriage are positioned substantially at the middle position between the front and rear of the carriage, and wherein the runner and the guide rail regulate the direction in which the carriage is oriented and the position in which the carriage supports a body.

15. A car type conveyor according to claim 10, wherein the base part of the carriage includes an inverted L riser rising on the side thereof supported by the runner, the riser including a horizontal top extending over and connected to the runner.

16. A car type conveyor according to claim 11, wherein the base part of the carriage includes an inverted L riser rising on the side thereof supported by the runner, the riser including a horizontal top extending over and connected to the runner.

17. A car type conveyor according to claim 10, wherein the base part of the carriage includes a substantially horizontal extension extending from the side thereof supported by the runner and hanging from the bottom of the runner.

18. A car type conveyor according to claim 11, wherein the base part of the carriage includes a substantially horizontal extension extending from the side thereof supported by the runner and hanging from the bottom of the runner.

19. A car type conveyor according to claim 10, wherein the running path is endless and includes a first passage, where the carriage runs with a body loaded thereon, and a second passage, where the carriage runs without a body loaded thereon, with the movable part folded over the base part, and wherein the inner edges of the two passages are adjacent to each other, the guide rail being endless and extending along the inner edges.

20. A car type conveyor according to claim 11, wherein the running path is endless and includes a first passage, where the carriage runs with a body loaded thereon, and a second passage, where the carriage runs without a body loaded thereon, with the movable part folded over the base part, and wherein the inner edges of the two passages are adjacent to each other, the guide rail being endless and extending along the inner edges.

* * * * *